US008081834B2

(12) United States Patent
Chou et al.

(10) Patent No.: US 8,081,834 B2
(45) Date of Patent: Dec. 20, 2011

(54) IMAGE PROCESSING METHOD AND RELATED PARTIAL PSF ESTIMATION METHOD THEREOF

(75) Inventors: Chao-Chin Chou, Taipei (TW); Chia-Chun Hsu, Taipei (TW); Chung-Chieh Kuo, Taipei (TW); Wen-Lung Chou, Taipei County (TW); Chen-Ning Hsi, Taipei (TW)

(73) Assignee: Primax Electronics Ltd., Neihu, Taipei (TW)

( * ) Notice: Subject to any disclaimer, the term of this patent is extended or adjusted under 35 U.S.C. 154(b) by 1077 days.

(21) Appl. No.: 11/835,416

(22) Filed: Aug. 7, 2007

(65) Prior Publication Data

US 2008/0253675 A1 Oct. 16, 2008

(30) Foreign Application Priority Data

Apr. 13, 2007 (TW) .............................. 96112965 A

(51) Int. Cl.
*G06K 9/40* (2006.01)
(52) U.S. Cl. ....................................... 382/255; 382/254
(58) Field of Classification Search .................. 382/254, 382/255
See application file for complete search history.

(56) References Cited

U.S. PATENT DOCUMENTS

| 6,859,564 B2* | 2/2005 | Caron | 382/264 |
| 2005/0265621 A1* | 12/2005 | Biggs et al. | 382/260 |
| 2006/0066911 A1* | 3/2006 | Miller et al. | 358/3.27 |
| 2007/0083114 A1* | 4/2007 | Yang et al. | 600/437 |
| 2007/0286517 A1* | 12/2007 | Paik et al. | 382/255 |

* cited by examiner

*Primary Examiner* — Stephen Koziol
(74) *Attorney, Agent, or Firm* — Winston Hsu; Scott Margo

(57) ABSTRACT

An image processing method includes (a) performing edge detection to an image to obtain a plurality of the edge pixels of the image; (b) performing partial PSF estimation to each of the edge pixels to generate a plurality of partial PSF estimation results; and (c) generating a PSF estimation result according to the partial PSF estimation results.

11 Claims, 6 Drawing Sheets

IMAGE PROCESSING METHOD AND RELATED PARTIAL PSF ESTIMATION METHOD THEREOF

BACKGROUND OF THE INVENTION

1. Field of the Invention

The present invention relates to an image processing method, and particularly relates to an image processing method utilizing a partial PSF estimation method and the utilized partial PSF estimation method.

2. Description of the Prior Art

FIG. 1 is a schematic diagram illustrating how a blurred image is formed. As shown in FIG. 1, a pixel P will be transformed to a blurred image region BP after passing a lens 101. Therefore a focus of an apparatus utilizing the lens 101, such as an optical microscope or a camera should be adjusted such that the pixel P can be transformed to a clear pixel. Normally, a mechanical adjusting mechanism is utilized to adjust the focus, that is, adjusting the mechanical structure of the apparatus to obtain suitable focus. However, such mechanism requires manual control (for example, on a microscope) and is inconvenient. In addition, since modern electronic devices tend to be compact and light, such mechanisms are not suitable for modern electronic devices.

One method to solve the above mentioned problems is by providing a specific lens, utilizing a transforming circuit to transform the pixel to a specific blurred image or a blurred image in a specific range, and an image processing method to recover the blurred image to an original image. However, such a method needs a specific lens, and a specific circuit to transform the outside image to form a specific blurred image, therefore it is not suitable for a normal apparatus.

Therefore, a new invention is needed to solve the above-mentioned problems.

SUMMARY OF THE INVENTION

Therefore, one objective of the present invention is to provide an image processing method to process a blurred image for generating a clear image without moving a lens and without limiting a lens type.

One embodiment of the present invention provides an image processing method, which comprises: (a) performing edge detection on an image to obtain a plurality of edge pixels of the image; (b) performing a partial point-spread function (PSF) estimation to each of the edge pixels to generate a plurality of partial PSF estimation results; and (c) generating a PSF estimation result according to the partial PSF estimation results.

Another embodiment of the present invention provides an image processing method, which comprises: (a) separating an image into a plurality of image blocks, and performing edge detection to the image blocks to obtain a plurality of edge pixels corresponding to the image blocks; (b) performing a partial PSF estimation to each of the edge pixels for each of the image block to generate a plurality of partial PSF estimation results; and (c) combining the partial PSF estimation results to generate PSF estimation results corresponding to the image blocks respectively.

Another embodiment of the present invention also discloses a partial PSF estimation method, which comprises: setting a range to be processed according to a pixel to be processed; and performing a PSF estimation to pixels in the range to be processed to generate a partial PSF estimation result.

According to the method mentioned above, a clear image can be obtained without moving a lens and without limiting lens types, thus lowering the cost of the product and expanding the application scope. Also, image recovery can be performed corresponding to the difference of each part of the image, such that the quality of the recovery image can be improved.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
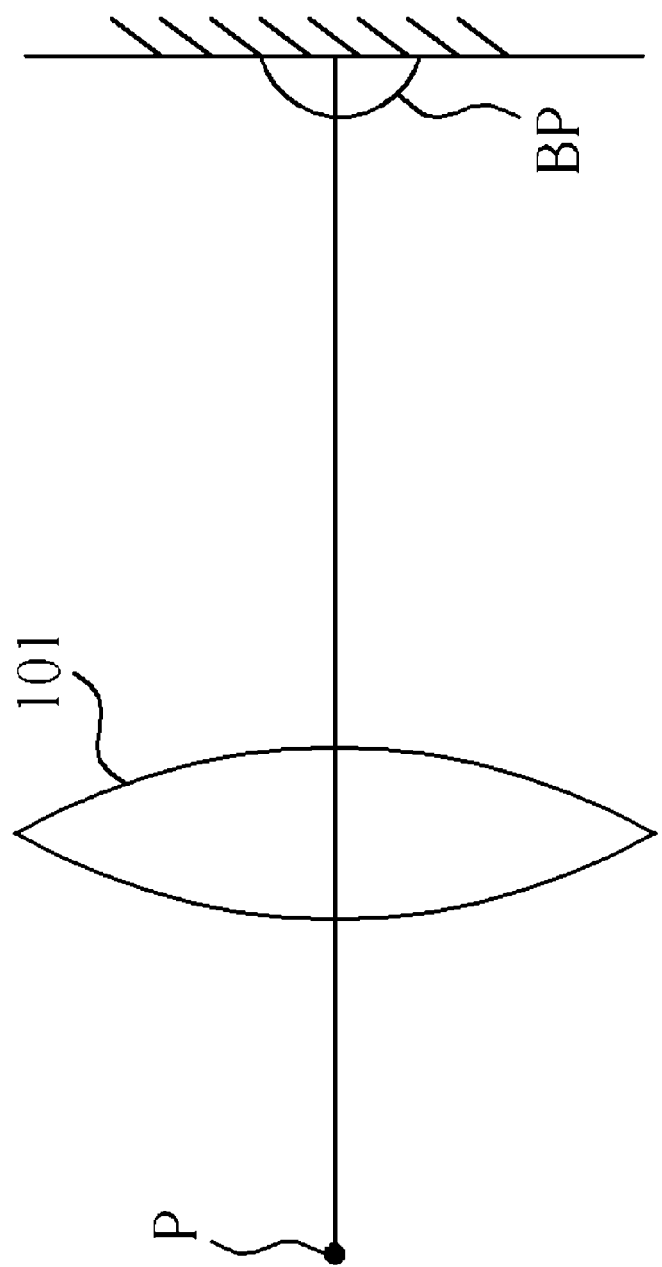
FIG. 1 is a schematic diagram illustrating how a blurred image is formed.
Figure 2:
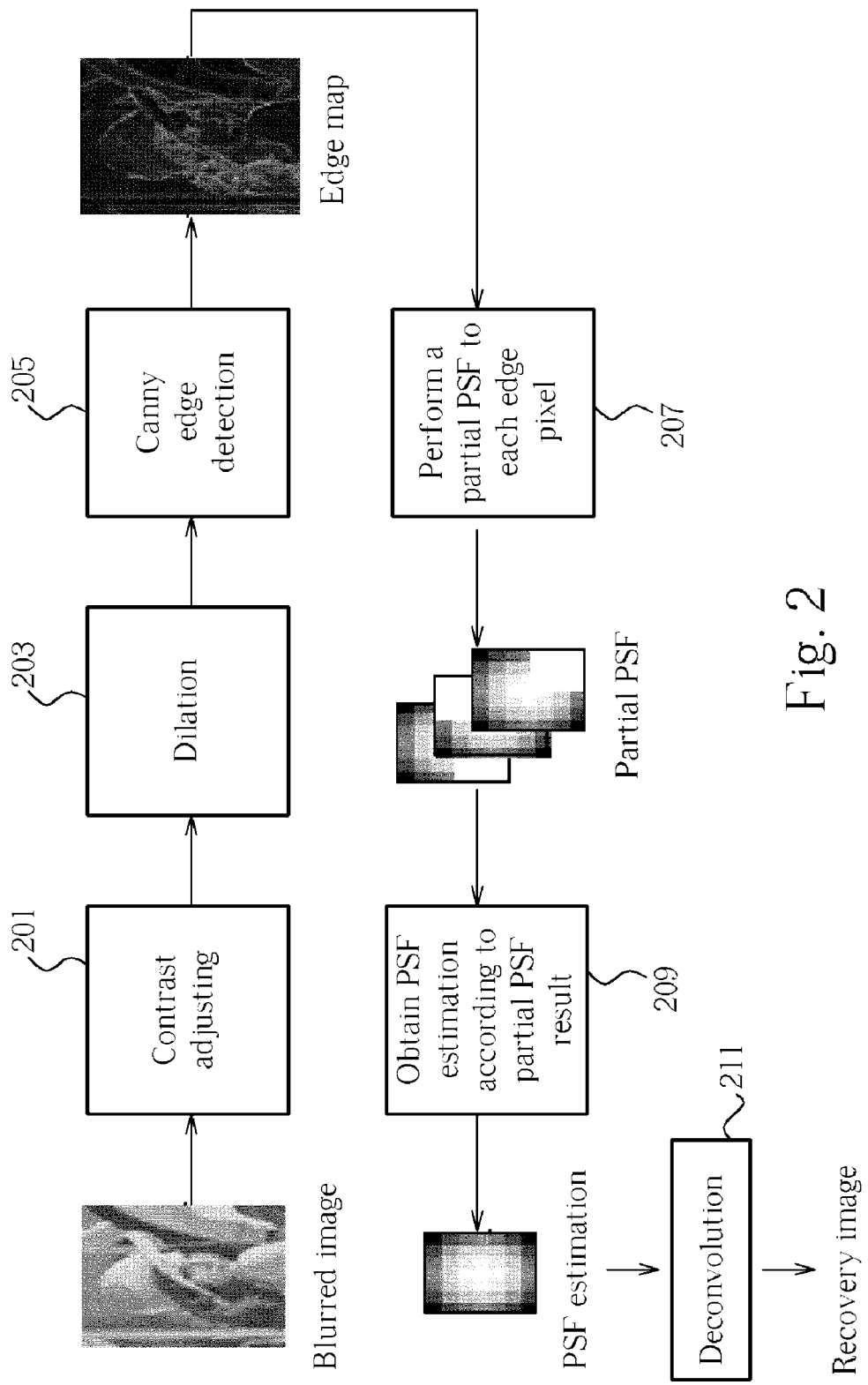
FIG. 2 is an image processing method according to a first preferred embodiment of the present invention.

FIG. 2 is an image processing method according to a first preferred embodiment of the present invention. As shown in FIG. 2, an edge map is obtained after a blurred image is processed by an adjusting process 201, a dilation process 203 and a Canny edge detection process 205. Then, in step 207, partial Point Spread Function (PSF) is performed to each edge pixel of the edge map to obtain a plurality of partial PSF estimation results. Next, in the step 209, PSF estimation result of the whole image can be obtained according to a plurality of partial PSF estimation results. In this embodiment, all partial PSF estimation results are averaged to obtain a PSF estimation result, but it is not meant to limit the scope of the present invention. Then, the step 211 is performed according to the PSF estimation result, such that deconvolution is applied to an image to obtain a recovery image. However, the PSF estimation result from the step 209 can be utilized for other usages and is not limited to be applied to the step 211.

The adjusting process 201 is utilized to intensify color contrast—for example, make a whiter part whiter and a black part blacker—such that the following edge detection parts can be more accurate. Dilation process 203 is used to remove the gray region from blurred black regions, thereby allowing the following edge detection step to detect edge pixels accurately. The more accurate the edge pixel detection, the better the PSF estimation result that can be obtained. After dilation process 203, a Canny edge detection process 205 is performed to obtain an edge map. In this embodiment, the Canny edge detection process 205 does not consider the directions of the edge pixels.

Figure 3:
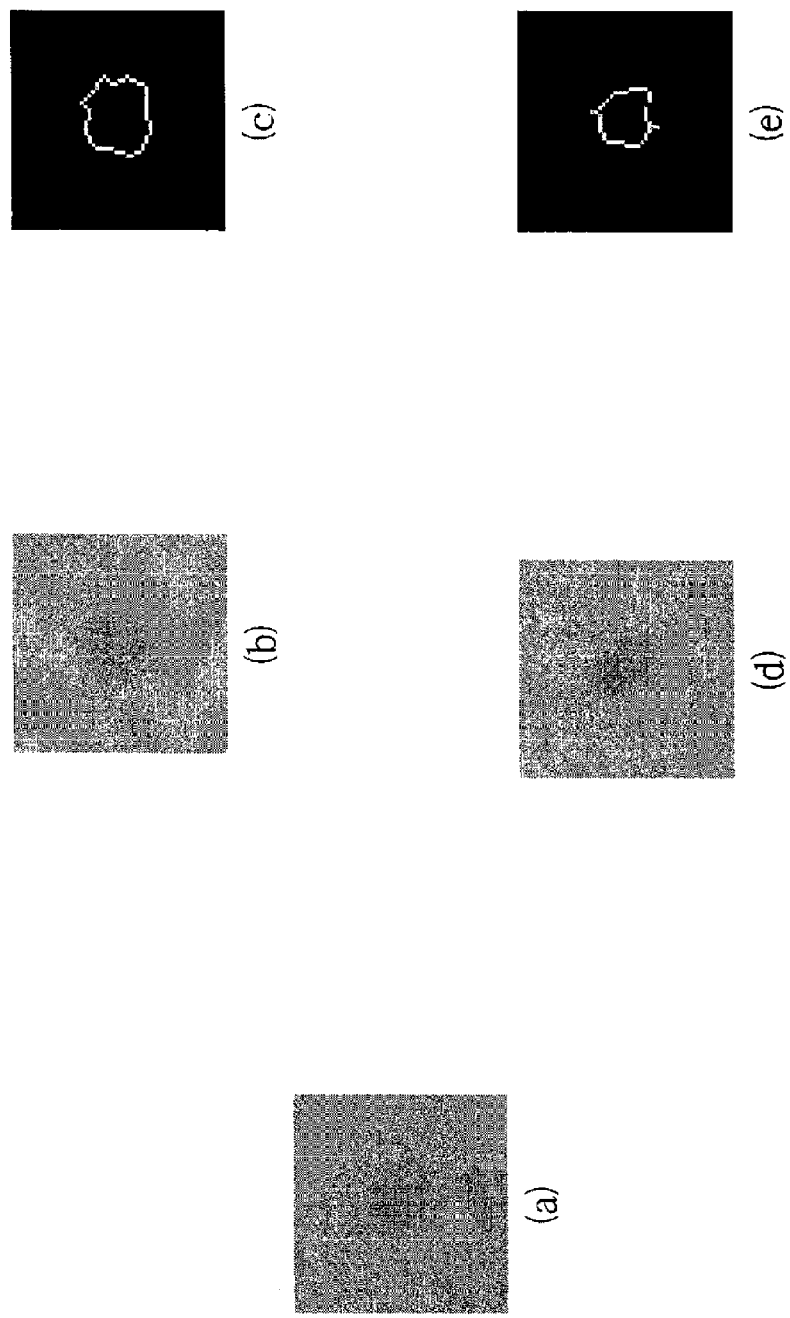
FIG. 3 is a schematic diagram illustrating how an edge picture is obtained via the edge detection shown in FIG. 2.

FIG. 3 is a schematic diagram illustrating how an edge picture is obtained via the edge detection shown in FIG. 2. FIG. 3(a) illustrates a blurred image of a pixel, FIG. 3(b) illustrates the state that the image from FIG. 3(a) is processed via the adjusting process 201, and FIG. 3(c) illustrates the edge map from FIG. 3(b). FIG. 3(d) illustrates the state of the image from FIG. 3(a) after being processed by the dilation process 203, and FIG. 3(e) illustrates an edge map from FIG. 3(d). According to FIG. 3(a)~FIG. 3(e), the edge map of the pixel after dilation processing is very near the center of the pixel, therefore it is an advantage preparation for PSF estimation.

It should be noted that the adjusting process 201, the dilation process 203 and the Canny edge detection process 205 can be regarded as an edge detection step, as known by persons skilled in the art, the edge detection step can be implemented to many different types. Therefore, the present invention is not limited to including the adjusting process 201, the dilation process 203 and the Canny edge detection process 205. All methods that can obtain an edge map should be included in the scope of the present invention.

As mentioned above, the step 207 performs a partial PSF estimation to each edge pixel of the edge map to obtain a plurality of partial PSF estimation results, but the applied edge pixels exclude pixels on the boundary in this embodiment. Also, in this embodiment, the definition of the partial PSF is a 2D matrix, which includes the impulse response of a whole PSF matrix. Step 207 can have two steps: (1) Sample the pixels in a specific range of an edge pixel, and (2) Filter specific pixels in a specific range.

The step (1) of Step 207 can be shown as the following equation:

$$PSF(x,y)=I([x-r:x+r],[y-r:y+r])$$

Wherein I(x,y) is an edge pixel with a specific sampling range (2r+1) by (2r+1). It should be noted that, although a rectangular area is utilized as a specific range in this embodiment, it is not intended to limit the present invention, and specific ranges with other shapes and sizes should also be included in the scope of the present invention.

Step (2) can be shown as the following equation:

$$\varepsilon = \begin{cases} \varepsilon & \text{if } \varepsilon > I(x, y) \\ 0 & \text{otherwise} \end{cases}$$

This equation indicates: if the pixel ε is darker than edge pixels I (x,y), it is ignored. The reason for this step is that the pixels darker than edge pixels I (x,y) are considered a part of an original document instead of a part of a blurred image, thus those pixels are ignored during partial PSF estimation.

Figure 4:
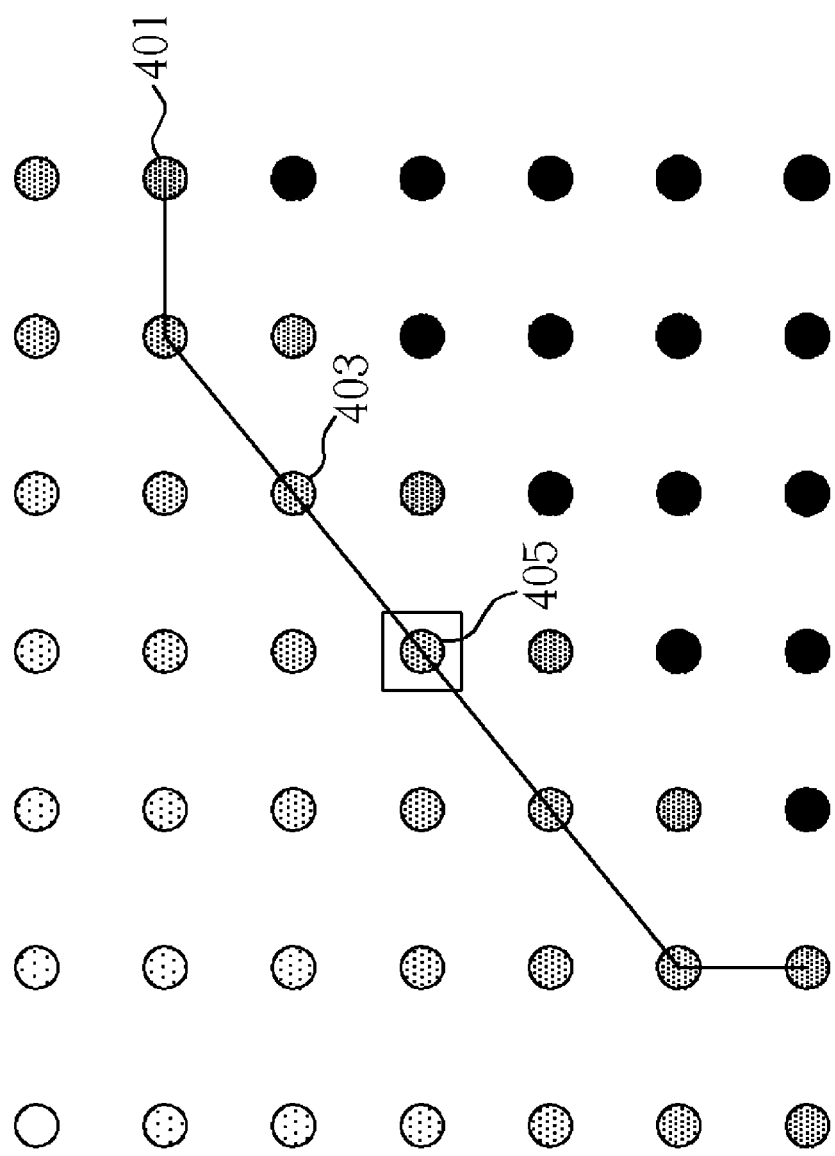
FIG. 4 is a schematic diagram illustrating a partial PSF estimation according to a preferred embodiment of the present invention.
Figure 5:
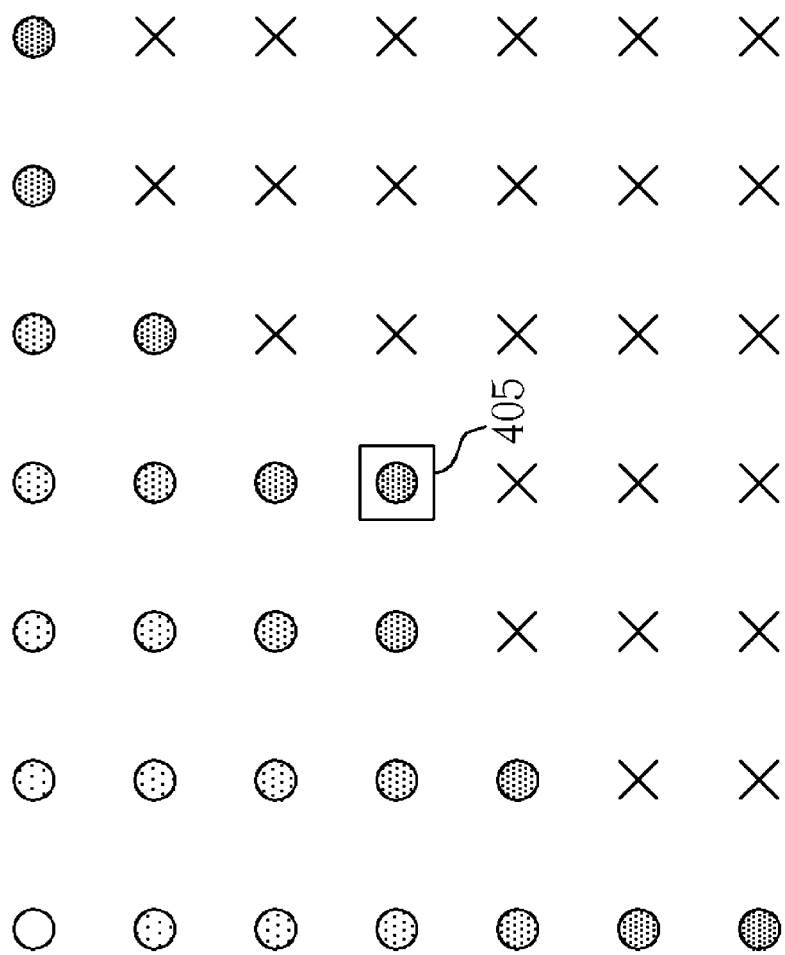
FIG. 5 is a schematic diagram illustrating a partial PSF estimation according to a preferred embodiment of the present invention.

FIG. 4 and FIG. 5 are schematic diagrams illustrating a partial PSF estimation according to a preferred embodiment of the present invention. As shown in FIG. 4, the pixels 401, 403, 405 on the line are all edge pixels, and the present embodiment utilizes a 3×3 rectangular range to perform partial PSF estimation for the pixel 405. As described above, the pixels that the partial PSF estimation are applied to exclude the pixels darker than the pixel 405 and the pixels on the boundary, that is, the pixels marked X in FIG. 5. Thus, the pixels that are not marked X in FIG. 5 are the real objectives of partial PSF estimation.

As described above, after the partial PSF estimation result is generated, a PSF estimation result can be obtained according to the partial PSF estimation result, and the de-convolution is performed on the image according to PSF estimation result. The deconvolution utilized in the embodiment of the present invention is the Wiener deconvolution method, which is utilized in a frequency domain and can decrease the noise effects of deconvolution. The Wiener deconvolution method can be shown as the following equation in the Fourier frequency domain:

$$W(f_1, f_2) = \frac{H^*(f_1, f_2)S_{xx}(f_1, f_2)}{|H(f_1, f_2)|^2 S_{xx}(f_1, f_2) + S_{\eta\eta}(f_1, f_2)}$$

wherein $H(f_1,f_2)$ is PSF, $S_{xx}(f_1,f_2)$ is the frequency spectrum of an original image, $S_{\eta\eta}(f_1,f_2)$ is the added noise, and * indicates the complex conjugate. Thus, according to the above-mentioned description, the Wiener method includes two parts: inverse filtering (high-pass filtering), and noise restraint (low-pass filtering). It should be noted that the present invention is not limited to Wiener deconvolution method, and other deconvolution methods can also be applied to the present invention.

Besides, the distortion levels of all parts of a blurred image may be different: for example, the distortion level at the image edges may be more severe than that at the image center. Therefore, non-ideal results may be obtained if a single PSF estimation result is utilized to process the whole image. Accordingly, the present invention provides another embodiment to solve this problem.

Figure 6:
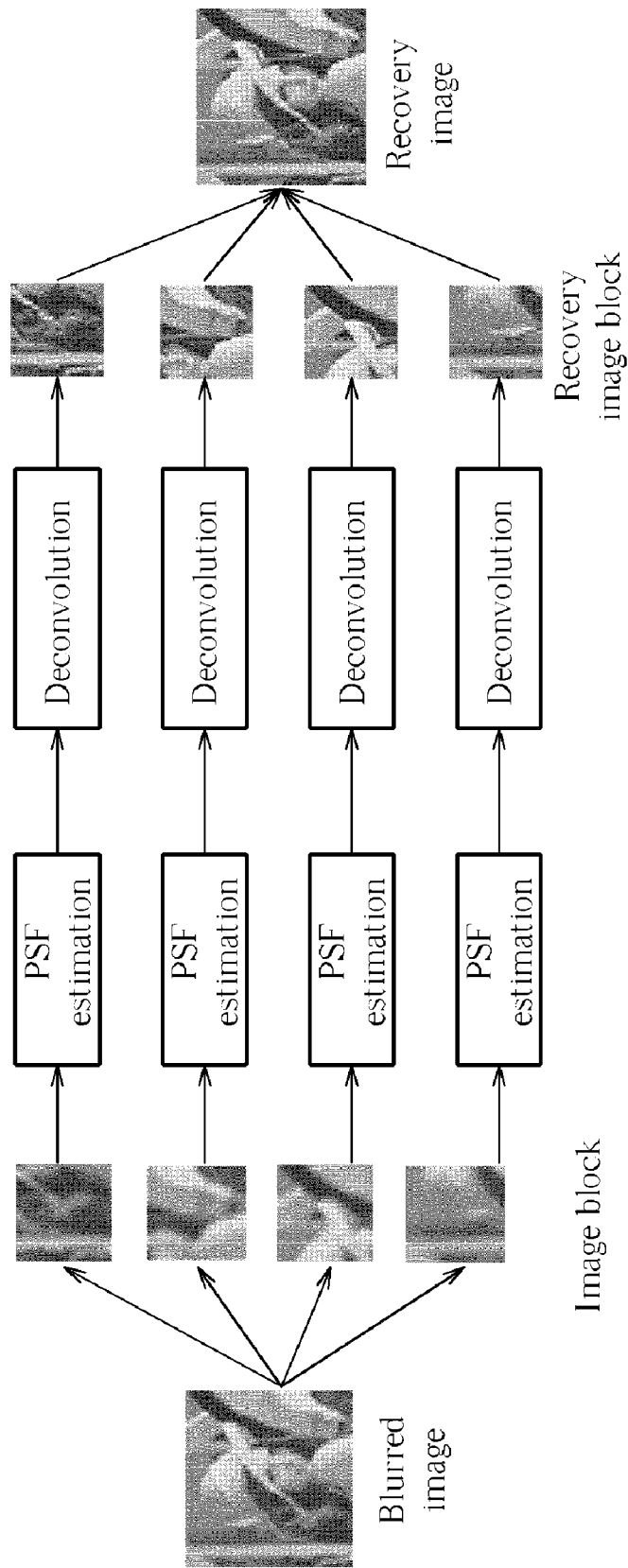
FIG. 6 is an image processing method according to a second preferred embodiment of the present invention.

FIG. 6 is an image processing method according to a second preferred embodiment of the present invention. The difference between the embodiment shown in FIG. 6 and the embodiment shown in FIG. 2 is that the second embodiment shown in FIG. 6 separates a blurred image into a plurality of image blocks, and then performs de-convolution to each image block according to the PSF estimation of each image block to generate a recovery image block. Next, merge each recovery image block to form a recovery image. Since the present embodiment obtains PSF estimation result for each block before deconvolution, the image recovery can respond to difference of each part of the image, thus the above-mentioned problem can be solved.

Those skilled in the art will readily observe that numerous modifications and alterations of the device and method may be made while retaining the teachings of the invention.

What is claimed is:

1. An image processing method, comprising:
   (a) performing edge detection to an image to obtain a plurality of edge pixels of the image;
   (b) performing partial point-spread function (PSF) estimation to each of the edge pixels for different parts of the image to generate a plurality of partial PSF estimation results respectively corresponding to the parts of the image, wherein the partial PSF estimation comprises:
      (b1) setting a range to be processed according to an edge pixel to be processed;
      (b2) sampling the pixels in the range to be processed to generate the partial PSF estimation results; and
      (b3) if a pixel value of a specific pixel in the range to be processed is smaller than pixel values of the edge pixels to be processed, do not perform the partial PSF estimation to the specific pixel and the edge pixels; and
   (c) generating a PSF estimation result for whole the image according to the partial PSF estimation results.

2. The image processing method of claim 1, further comprising:
   (d) performing deconvolution to the image according to the partial PSF estimation results to generate a recovery image.

3. The image processing method of claim 1, wherein the step (a) comprises the following steps:
   (a1) adjusting contrast of the image;
   (a2) performing dilation processing to the image; and
   (a3) performing Canny edge detection to the image to obtain the edge pixels.

4. The image processing method of claim 1, wherein the image is generated from an image capturing apparatus.

5. An image processing method, comprising:
(a) separating an image into a plurality of image blocks, and performing edge detection to the image blocks to obtain a plurality of edge pixels corresponding to the image blocks;
(b) performing partial PSF estimation to each of the edge pixels for each of the image blocks to generate a plurality of partial PSF estimation results respectively corresponding to the image blocks, wherein the partial PSF estimation comprises:
(b1) setting a range to be processed according to an edge pixel to be processed;
(b2) sampling the pixels in the range to be processed to generate the partial PSF estimation results; and
(b3) if a pixel value of a specific pixel in the range to be processed is smaller than pixel values of the edge pixels to be processed, do not perform the partial PSF estimation to the specific pixel and the edge pixels; and
(c) combining the partial PSF estimation results to generate PSF estimation results for whole the image.

6. The image processing method of claim 5, further comprising:
(d) performing deconvolution to the image blocks according to the partial PSF estimation result to generate a plurality of recovery image blocks; and
(e) merging the recovery image blocks to generate a recovery image.

7. The image processing method of claim 5, wherein the step (a) comprises the following steps:
(a1) adjusting contrast of the image blocks;
(a2) performing dilation processing to the image blocks; and
(a3) performing Canny edge detection to the image blocks to obtain the edge pixels.

8. The image processing method of claim 5, wherein the image is generated from an image capturing apparatus.

9. The image processing method of claim 1, wherein the step (c) comprising:
averaging the partial PSF estimation results to generate the PSF estimation result.

10. An image processing method, comprising:
(a) performing edge detection to an image to obtain a plurality of edge pixels of the image, comprising:
(a1) adjusting contrast of the image;
(a2) performing dilation processing to the image; and
(a3) performing Canny edge detection to the image to obtain the edge pixels;
(b) performing partial point-spread function (PSF) estimation to each of the edge pixels for different parts of the image to generate a plurality of partial PSF estimation results respectively corresponding to the parts of the image; and
(c) generating a PSF estimation result for whole the image according to the partial PSF estimation results.

11. An image processing method, comprising:
(a) separating an image into a plurality of image blocks, and performing edge detection to the image blocks to obtain a plurality of edge pixels corresponding to the image blocks, comprising:
(a1) adjusting contrast of the image blocks;
(a2) performing dilation processing to the image blocks; and
(a3) performing Canny edge detection to the image blocks to obtain the edge pixels;
(b) performing partial PSF estimation to each of the edge pixels for each of the image blocks to generate a plurality of partial PSF estimation results respectively corresponding to the image blocks; and
(c) combining the partial PSF estimation results to generate PSF estimation results for whole the image.

* * * * *